US005774044A

United States Patent [19]
Hayashi

[11] Patent Number: 5,774,044
[45] Date of Patent: Jun. 30, 1998

[54] ALARM DEVICE HAVING INTEGRATED BATTERY

[75] Inventor: Toshio Hayashi, Anjo, Japan

[73] Assignee: Denso Corporation, Kariya, Japan

[21] Appl. No.: 764,021

[22] Filed: Dec. 11, 1996

[30] Foreign Application Priority Data

Dec. 12, 1995 [JP] Japan .................................... 7-346629
Sep. 30, 1996 [JP] Japan .................................... 8-280230

[51] Int. Cl.$^6$ ............................................ B60Q 1/00
[52] U.S. Cl. ....................... 340/426; 340/428; 180/287; 307/10.2; 307/10.7
[58] Field of Search ................................ 340/426, 428; 180/287; 307/10.7, 10.2, 10.3

[56] References Cited

U.S. PATENT DOCUMENTS

| | | | |
|---|---|---|---|
| 3,656,102 | 4/1972 | Hale et al. ................................ | 340/426 |
| 3,815,088 | 6/1974 | Kumpfbeck et al. .................... | 340/426 |
| 4,761,631 | 8/1988 | Hwang ..................................... | 340/426 |
| 4,933,664 | 6/1990 | Igawa et al. ............................. | 340/426 |
| 5,153,558 | 10/1992 | Robinson et al. ....................... | 340/428 |
| 5,473,200 | 12/1995 | Woo ........................................ | 307/10.2 |
| 5,563,576 | 10/1996 | Drori et al. .............................. | 340/426 |
| 5,638,270 | 6/1997 | Maeda et al. ........................... | 340/428 |

Primary Examiner—Edward Lefkowitz
Attorney, Agent, or Firm—Cushman, Darby & Cushman IP Group of Pillsbury Madison, & Sutro LLP

[57] ABSTRACT

An alarm device of an anti-theft system for a vehicle is composed of a microcomputer ordinary connected by a power-supply wire to a vehicle battery, an electric-sound-generator driven by the microcomputer, a wire-disconnection-detecting-circuit for detecting disconnection of the power-supply-wire of the alarm device from a vehicle battery, an integrated auxiliary battery connected to the microcomputer and the sound-generator, a transistor for cutting power supply to the microcomputer from the auxiliary battery when the anti-theft system is not on the watch, sensors for detecting access to the vehicle compartment and an outside controller connected to the sensors to turn on the transistor when the system is on the watch and turns off the transistor when the system is not on the watch. If the access to the vehicle compartment or wire-disconnection is detected while the anti-theft system is on the watch, the microcomputer drives the sound-generator to give the alarm.

7 Claims, 6 Drawing Sheets

ALARM DEVICE HAVING INTEGRATED BATTERY

BACKGROUND OF THE INVENTION

1. Field of the Invention

The present invention relates to an alarm device and, particularly, to an alarm device for an anti-theft device having an auxiliary battery integrated with the alarm device.

2. Description of the Related Art

A well-known alarm device for a anti-theft system is generally composed of a concealed key switch, an auxiliary battery, a wire-disconnection-detecting circuit, an oscillator and a speaker.

The alarm device is electrically connected to a main battery of the vehicle and an ECU. When the concealed switch of the alarm device is turned on manually, the wire-disconnection-detecting circuit and the oscillator are energized by the main battery and the auxiliary battery at the same time. However, the terminal voltage of the auxiliary battery is set lower than that of the main battery.

If the ignition switch is turned off and a door-lock switch is turned on, the ECU is set to be on the watch. In this state, if disconnection of a wire is detected or window glass is broken and if an ultrasonic or infrared detector for detecting access to the vehicle sends a signal indicating an abnormal conditions the alarm device drives the oscillator and the speaker to give the alarm.

If the wire connecting the main battery and the alarm device is disconnected, the auxiliary battery energizes the alarm device to give the alarm. If a maintenance work of the vehicle is carried out, the concealed key switch is turned off manually to cut the power supply from the main battery and the auxiliary battery, thereby deactivating the speaker.

In the above conventional system, if the battery is disconnected in maintenance work or the like, it is necessary and troublesome to turn off the concealed switch, or the wire-disconnection-detecting circuit senses a voltage drop of the wire and give the alarm of the wire-disconnection.

SUMMARY OF THE INVENTION

Accordingly, the present invention is made in view of the above problem and has an object of providing an improved alarm device which does not give an alarm even if the electrical connection between the main battery and the alarm device is cut for maintenance work or the like without specific manual operation.

In order to solve the above problem, an improved alarm device has a changeover unit which activates an alarming-sound generator when a wire-disconnection-detecting unit detects disconnection of a main battery and deactivates automatically if the main battery and the alarm device is disconnected for a maintenance work.

Another object of the present invention is to provide an alarm device, in which a watch signal and a watch-free signal is sent to a driving unit through a single input-wire so that the driving unit determines whether the system is on the watch or not. Therefore, no separate input wires for the respective two signals.

Another object of the present invention is to provide an alarm device, in which an abnormality signal produced by an abnormality-detecting unit is applied to the driving unit through the input-wire together with the watch signal and watch-free signal so that the driving unit can discriminate respective signals. Therefore, additional input-wire is not necessary and an alarm device having a small number of parts can be provided.

Another object of the present invention is to provide an alarm device, in which when a determining means determines that the system is on the watch, the driving unit drives the changeover unit to render the auxiliary battery ready for power supply so that if an abnormality such as an access to the vehicle compartment or breakage of the window glass is detected by the abnormality-detecting unit, the alarming-sound generator is activated by the vehicle battery. If a disconnection of the driving unit from the vehicle battery is detected by the disconnection-detecting unit, the alarming-sound generator is activated by the auxiliary battery. If the main battery and the alarm device is disconnected because maintenance work or the like while the system is not on the watch, the changeover unit renders the auxiliary battery isolated, thereby deactivating the alarming-sound generator. Therefore, no specific operation is necessary to deactivate the alarming-sound generator for the maintenance work.

Another object of the present invention is to provide an alarm device, in which the determining means determines that the system is on the watch when an ignition switch is turned off and a door-lock switch is turned off, and that the system is not on the watch when the ignition switch is turned on and door-lock switch is turned off. Therefore, the watch signal and watch-free signal can be made with a simple structure and an alarm device of high security can be provided.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS (First Embodiment)

An alarm device 1 according to a first embodiment of the present invention is described with reference to FIGS. 1–5J.

Figure 1:
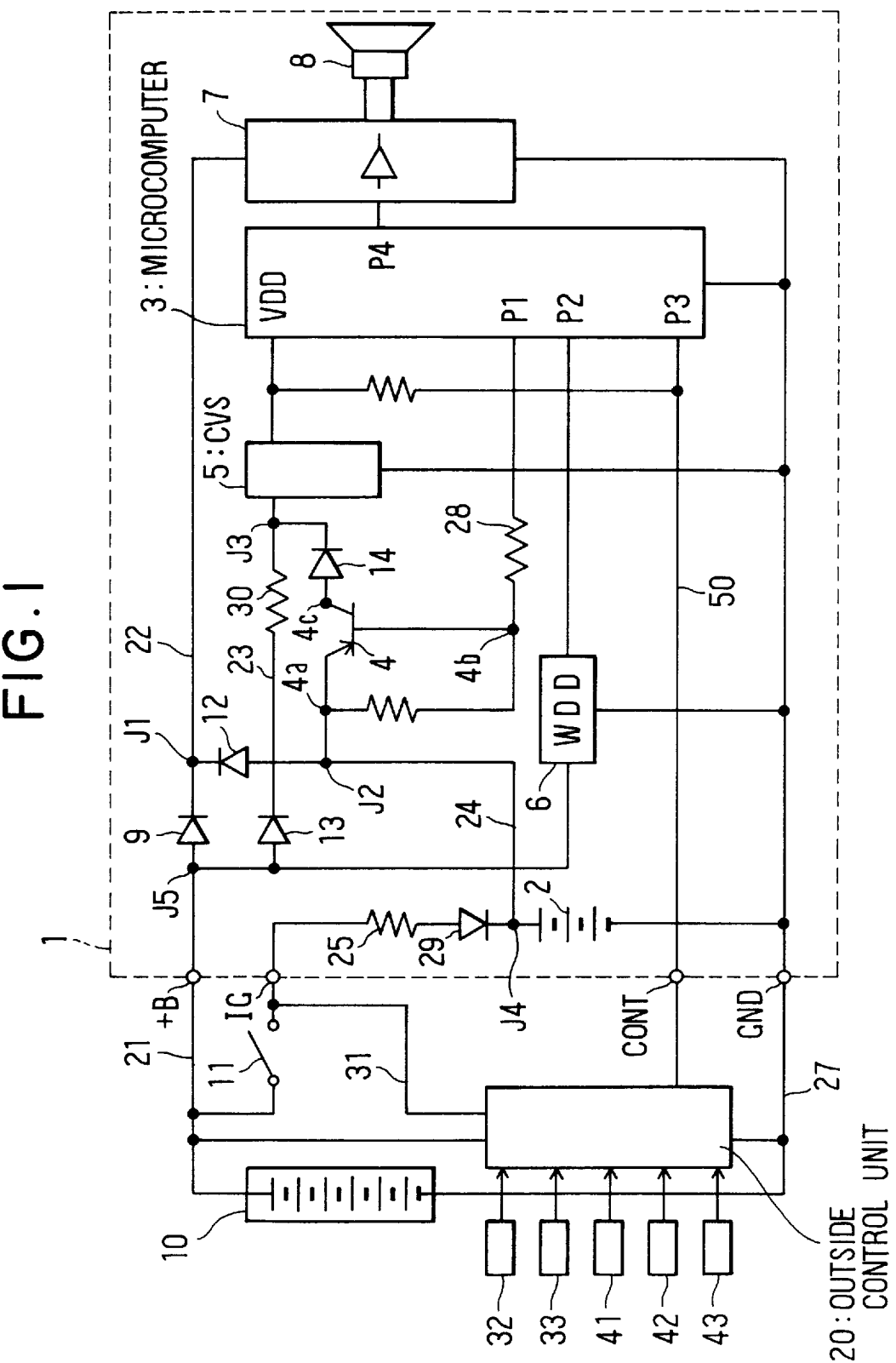
FIG. 1 is a schematic circuit diagram showing an alarm device according to a first embodiment of the present invention.

As shown in FIG. 1, the alarm device 1 used for anti-theft system for a vehicle is mainly composed of an integrated auxiliary battery 2, a wire-disconnection-detecting circuit 6, a transistor 4, a constant-voltage-power-source 5, a microcomputer 3, an amplifying circuit 7 and electric-sound-generator 8.

The alarm device 1 has a +B terminal which is connected to the plus terminal of a vehicle battery 10 mounted on the vehicle through a power-supply wire 21. Electric power is supplied from the battery 10 through a diode 9 and a power-supply wire 22 to the amplifying unit 7 disposed in the alarm device 1 and through a diode 13, a power-supply wire 23 and a resistor 30 to the constant-voltage-power-source 5. The alarm device 1 is also connected to an ignition switch 11 through the terminal IG. The other terminal of the ignition switch 11 is connected to the power-supply wire 21. The alarm device 1 is also connected to an outside controller 20 through an input terminal CONT and to a ground through a terminal GND.

A power-supply wire 24 connects the plus terminal of the auxiliary battery 2 to the emitter 4a of the transistor 4 and the anode of the diode 12 at a junction J2. The cathode of the diode 12 is connected to the power-supply wire 22 at a junction J1. The auxiliary battery 2 supplies the backup power to the constant-voltage-power-source 5, the microcomputer 3 and the amplifying unit 7 if the power-supply wire 21 connecting the vehicle battery 10 and the terminal +B is disconnected.

The plus terminal of the auxiliary battery 2 is connected to the ignition switch 11 through a junction J4, a diode 29, a resistor 25 and the terminal IG. Therefore, when the ignition switch 11 is turned on, electric power is supplied from the battery 10 to charge the auxiliary battery 2.

The wire-disconnection-detecting circuit 6 is composed of a diode and a parallelly-connected resistor (not shown) and is connected through the power-supply wire 21 to the vehicle battery 10 and connected to a grounded wire 27 at the terminal GND. When the disconnection of the power-supply wire 21 and grounded wire 27 is detected, a detection signal is transmitted to a port P2 of the microcomputer 3.

The transistor 4 is ready for power supply to the constant-voltage-source 5 from the backup battery 2 when the system is put on the watch. The emitter 4a of the transistor 4 is connected to the plus-terminal of the backup battery 2 at the junction J2. The base 4b thereof is connected to the port P1 of the microcomputer 3 through a resistor 28 and the collector 4c thereof is connected to the anode of the diode 14. The cathode of the diode 14 is connected to the power-supplying wire 23 at the junction J3.

The constant-voltage-power-source 5 is powered by the battery 10 and the auxiliary battery 2 to supply a constant voltage to the microcomputer 3 through a terminal VDD.

The microcomputer 3 receives a detection signal from the wire-disconnection-detecting circuit 6 and a discrimination signal from the outside controller 20 through the ports P2 and P3 respectively. The microcomputer 3 controls the transistor 4 to turn on or off according to the above signals and sends an oscillation signal to the electric sound generator 8 from the output port P4 through the amplifying circuit 7. The amplifying circuit 7 is composed of amplifying elements such as transistors and FETs and amplifies the oscillating signal sent from the output port P4 of the microcomputer 3. The electric-sound generator 8 converts the signal amplified by the amplifying circuit 7 into an alarming sound.

The outside controller 20 detects the on/off state of the ignition switch 11 through a signal line 31 and on/off state of a door-lock switch 32 and a door-courtesy switch 33. The outside controller 20 determines whether the alarm device is on the watch or not by processing the signals through a process described later. The outside controller 20 receives signals from a window-glass sensor 41, an ultrasonic sensor 42 and a vibration sensor 43 and determines whether abnormal or not by a later-described process according to those signals. The outside controller 20 provides one of the discrimination signals such as a watch signal, a watch-free signal or an abnormality signal at the terminal CONT and give it to the port P3 of the microcomputer 3 through an input wire 50.

The operation of the outside controller 20 is described with reference to flow charts shown in FIGS. 2 and 3.

Figure 2:
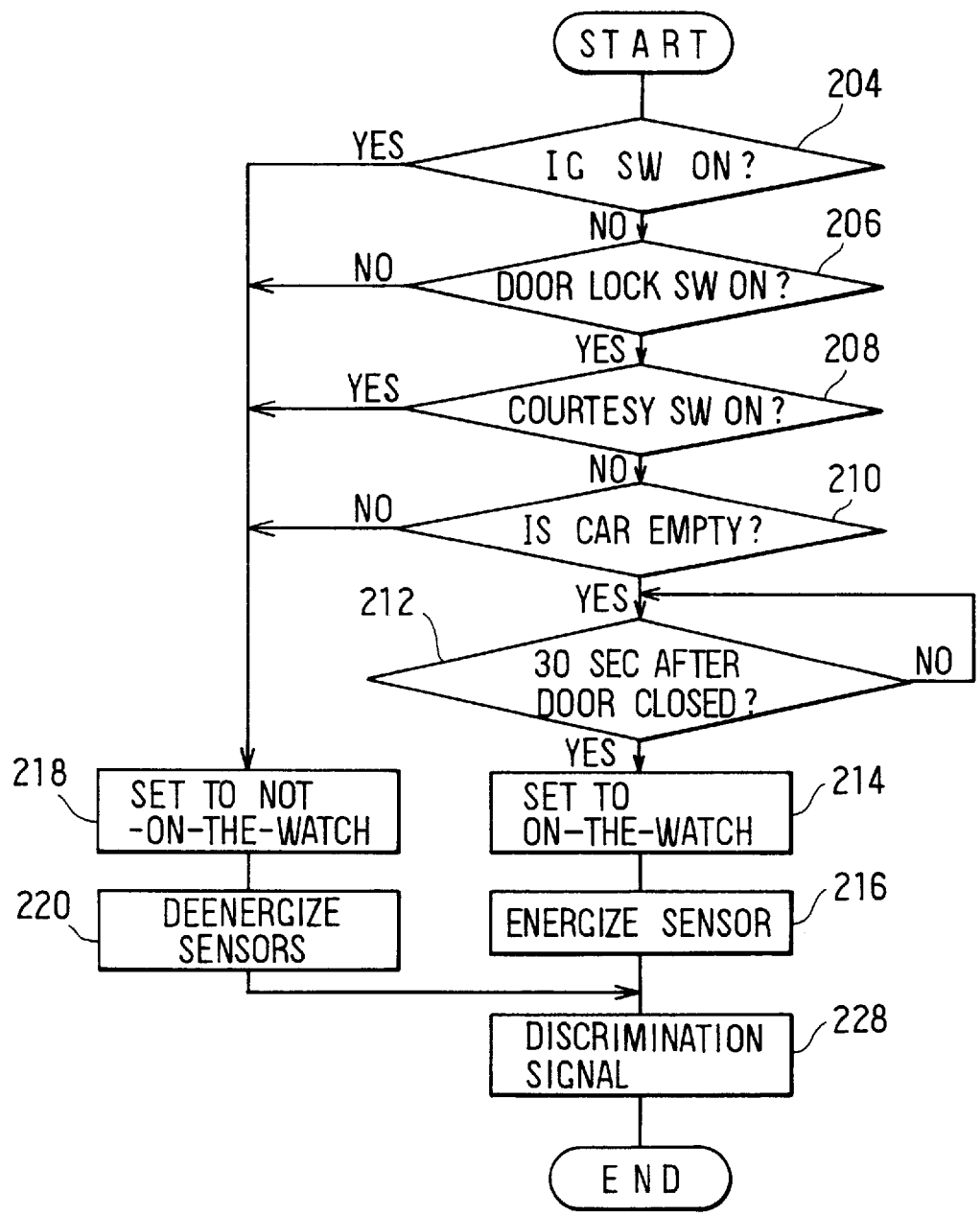
FIG. 2 is a flow chart showing processing steps of an outside controller.

The process shown in FIG. 2 is initiated by the on or off signal of the door-lock signal as a interrupt signal. At first, whether the ignition switch 11 is turned on or not is examined (step 204), and whether the door-lock switch 32 is turned on or not is examined (step 206). If a driver is going to release the door-lock to get in the car while the system is put on the watch, the outside controller 20 determines NO in the step 206 and the watch-free condition is set in step 218. Thereafter, the window-glass sensor 41 and the vibration sensor 43 are deenergized (step 220), and a watch-free signal (one of the discrimination signals) is produced (step 228). The ultrasonic sensor 42 is kept energized in the step 220 in this moment.

Thereafter, the driver releases the door-lock , opens the door, get in the car and turns on the ignition switch 11. When the ignition switch 11 is turned on, step 204 produces YES, thereby maintaining the watch-free state (step 218).

When the driver stops the car, turns off the ignition switch 11, releases the door lock, opens the door and sets the door lock, the steps 204, 206 and 208 produce NO, YES and No signals respectively. If the outside controller 20 reads the output signal of the ultrasonic sensor 42 and determines that nobody is present in the car (that is, the car is empty), YES is produced in step 210.

Thereafter, if a period of 30 seconds has passed (step 212), it is determined that the driver has left the car and the antii-theft system is put on the watch (step 214). Consequently, the window-glass sensor 41 and the vibration sensor 43 are energized (step 216), and the watch signal is produced (step 228). If the ignition switch 11 is turned on in the step 204, the door-lock switch 32 is turned off in the step 206, the door-courtesy switch 33 is turned on in the step 208, or somebody is detected in the car, the step is transferred to step 218, where not-on-the watch state is maintained.

In on-the-watch state, whether an abnormal condition is present or not is determined. The watching steps are shown in FIG. 3. Firstly, whether the system is put on the watch or not is determined (step 302). If it is determined that the system is on the watch, signals from the window-glass sensor 41, ultrasonic sensor 42 and vibration sensor 43 are read in step 304. Subsequently, the abnormal condition is determined according to those signals in step 306. If at least one of those signals indicates the abnormal condition, an abnormality signal is produced in step 308. If the system is maintained on the watch-free in the step 302 or the abnormal condition is not present in the step 306, the steps are ended. Thus, the abnormal condition is determined.

Figure 3:
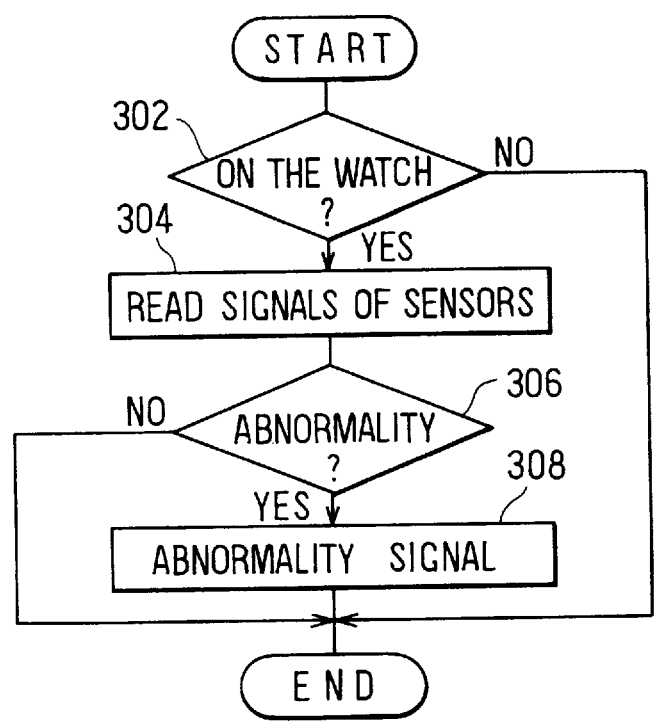
FIG. 3 is a flow chart showing processing steps when an abnormal condition is detected by the outside controller.

The watch signal, the watch-free signal or the abnormality signal is applied by means of the steps shown in FIGS. 2 and 3 from the terminal CONT through the input wire 50 to the port P3 of the microcomputer 3 of the alarm device 1. The above signals are coded into a pulse train to prevent malfunction of the alarm service 1 due to outside noises.

Figure 4:
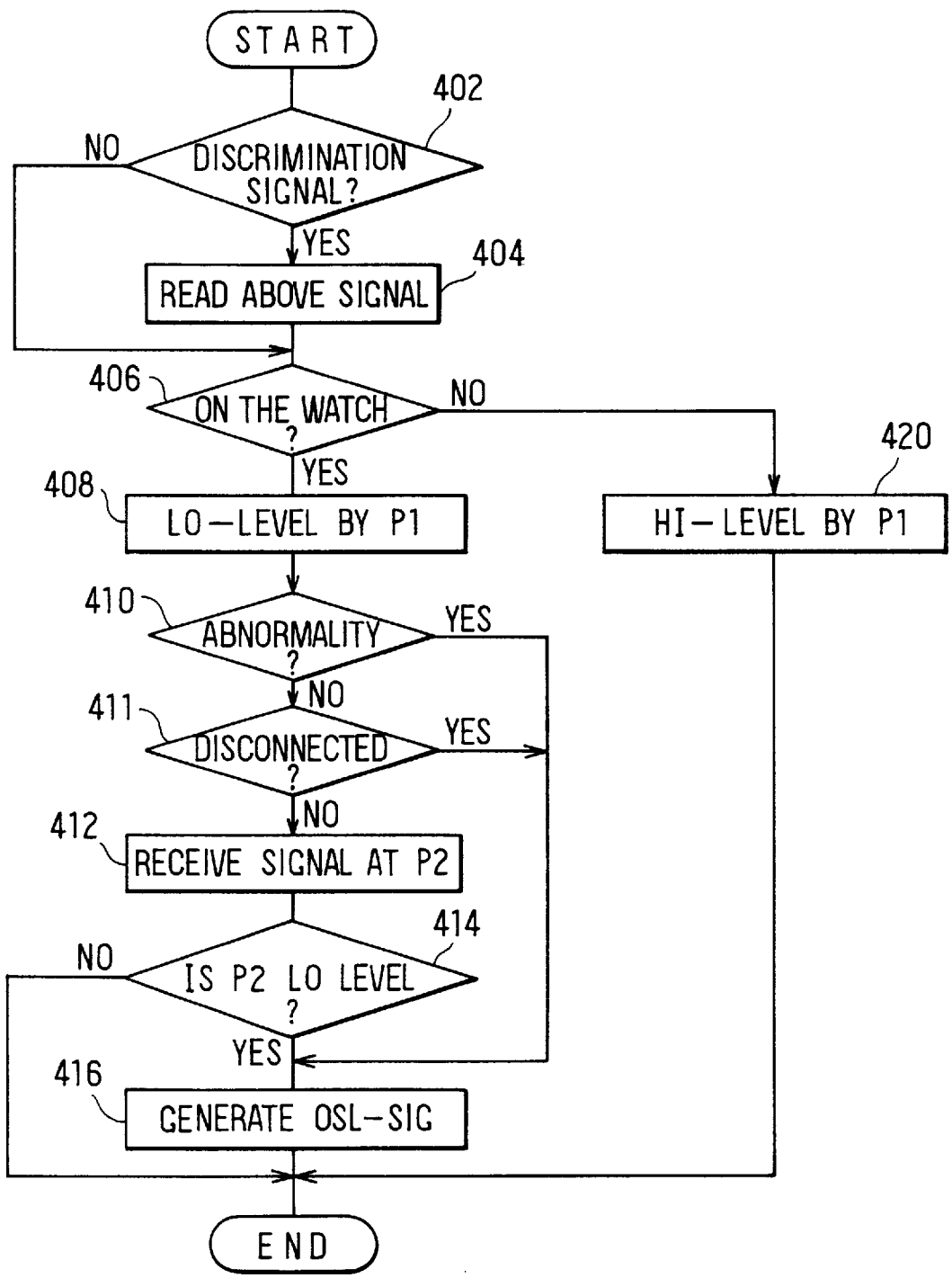
FIG. 4 is a flow chart showing processing steps of the outside controller.
Figure 5:
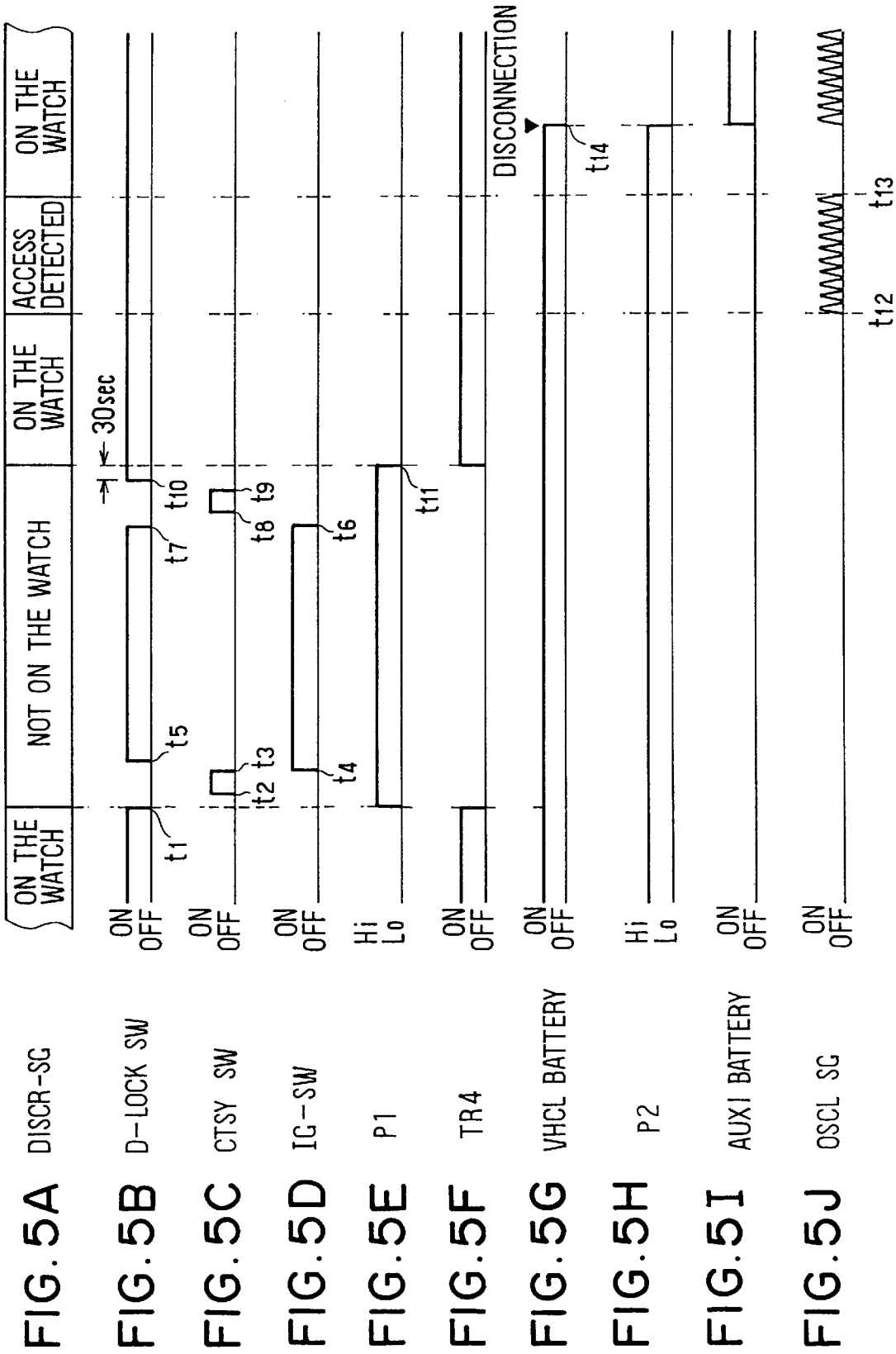
FIGS. 5A–5J are a timing chart showing operation of the alarm device.

The operation of the microcomputer 3 is described with reference to a flow-chart shown in FIG. 4. The steps shown in FIG. 4 are executed at certain intervals, and the operation is continued until the next signal is received.

At first, whether or not the discrimination signal is transmitted from the terminal CONT through the port P3 is determined (step 402). If the signal is transmitted, the signal is read according to a discrimination program written in an inside memory (ROM, not shown) of the microcomputer 3, and the alarm device 1 is put on the watch according to the signal (step 404). If the signal is not received, in the step 402, whether the system is on the watch or not at present is determined (404).

If the system is on the watch, YES is produced in step 406 and the output signal of the port P1 becomes Lo-level(step 408), which turns on the transistor 4 to connect the auxiliary battery 2 to the constant-voltage-source 5. Then, the presence of the abnormality is examined (step 410). If the abnormality is not present, NO is produced in the step 410, and whether the input wire is disconnected or not is determined in the next step 411.

The transistor 4 is the PNP-type and the potential of the base 4b thereof becomes Hi-level on account of the auxiliary battery to turn off at the initial stage (the output terminals of the microcomputer are open). The microcomputer 3 is open-drain type, and the base potential at the initial stage becomes Hi-level in this embodiment. However if the microcomputer 3 is a sink drain type, the transistor 4 is required to be the NPN-type because the potential of the base thereof at the initial stage becomes Lo-level.

If the transistor 4 is turned on and the power-supply-wire 21 and the grounded-wire 27 normally connect the battery 10 and the alarm device 1, the potential of the junctions J1 and J3 becomes higher than a voltage which is left after subtracting the voltage drop of the diodes 9 and 13 from the terminal voltage of the battery 10 (about 12 V), reducing the supply current from the auxiliary battery 2 so that the constant-voltage source 5 and the amplifying circuit 7 are energized from the vehicle battery 10 through the terminal +B.

After the port P1 becomes Lo-level in the step 408, the microcomputer 3 receives a signal at the port P2 (step 412) and determines whether it is Lo-level or not (step 414). The port P2 is connected to the wire-disconnection-detecting circuit 6 which is connected to the power-supply-wire 21, the Lo-level signal sent to the port P2 indicates that the power-source-wire is disconnected by somebody and the potential of the +B terminal disappears. If the power-supply-wire 21 is disconnected, the potential of the junctions J1 and J2 becomes lower than the terminal voltage of the auxiliary battery 2, and the constant-voltage-source 5 and the amplifying circuit 7 are energized by the auxiliary battery 2. If the port P2 becomes Lo-level, the microcomputer 3 energizes the amplifying circuit 7 and generates the oscillating signal according to a program (step 416). The oscillating signal is converted through the amplifying circuit 7 to an alarming sound of about 120 decibel by the electric sound generator 8.

If the input signal sent from the port P2 is not the Lo-level signal in the step 414, it is determined that the power-supply-wire is not disconnected, and the step is ended. If it is determined that the abnormality is present in the step 410 or that the input wire 50 is disconnected in the step 411, YES is determined in the respective steps, and the amplifying circuit 7 is energized and the oscillating signal is generated in the step 416 to sound the alarm. If the system is not on the watch in the step 406, the output voltage of the port P1 becomes the initial level (Hi-level, step 420 ). In the step 420, the transistor 4 is turned off, and the constant-voltage-source 5 is not energized by the auxiliary battery 2. Therefore, even if the power-supply-wire 21 is disconnected from the battery 10, the power is not supplied from the auxiliary battery 2.

Before the alarm device 1 is installed in the vehicle, in other words, if the alarm device 1 is not connected to the power-supply-wire 21 or the signal wires from the outside controller 20, the microcomputer 3 is not energized and the transistor 4 maintains the off state to deenergize the constant-voltage-source 5. Thus, the electric supply from the battery 2 before installation is cut so that the auxiliary battery 2 is prevented from lowering the charging voltage, thereby preventing the alarm device 1 from alarming when it is dismounted from the vehicle for a maintenance service.

The states of the alarm device 1 being on the watch or not on the watch and the operation of the alarm device 1 when the disconnection takes place are shown in a timing chart in FIGS. 5A–5J.

When a watch signal indicates the state of the system on the watch, the port P1 becomes Lo-level as shown in FIG. 5E, and the transistor 4 is turned on as shown in FIG. 5F. Thus, the constant-voltage-source 5 and the amplifying circuit 7 are powered from one of the junctions J1, J2 and J3 whose potential is the highest. Because the potential (12 V) of the junctions J1 and J3 is higher than the potential (about 4–8 volt) of the junction 4, the constant-voltage-source 5 and the amplifying circuit 7 are powered by the vehicle battery 10 as shown in FIG. 5G. Therefore, the power supply is not carried out by the auxiliary battery 2 as shown in FIG. 5I. As long as the power-supply-wire 21 is not disconnected, the port 2 maintains the Hi-level voltage as shown in FIG. 5H.

If a driver releases the door lock at time t1, a signal indicating not-on-the watch as shown in FIG. 5A is sent from the outside controller 20, the port P1 becomes Hi-level as shown in FIG. 5E and the transistor 4 is turned off as shown in FIG. 5F. If the driver starts the engine in a period t4–t5 in FIG. 5D and gets out of the car and, subsequently, sets the door lock at time t10 as shown in FIG. 5B, the watch-free state continues for 30 seconds.

The transistor 4 is turned off while the system is put on the watch-free and, therefore, power supply to the constant voltage-source 5 is not furnished by the auxiliary battery 2 but furnished by the vehicle battery 10 as shown in FIGS. 5G and 5I.

At time t11 when 30 seconds passed after the door-lock is set as shown in FIG. 5B, the port P1 becomes Lo-level as shown in FIG. 5E, and the transistor 4 is turned on as shown in FIG. 5F. Thus, the power supply from the auxiliary battery 2 becomes available.

If at least one of the window-glass sensor 41, ultrasonic sensor, 42 and vibration sensor 43 detects an abnormal condition at time t12, an oscillation signal is sent from the port P4 as shown in FIG. 5J, and the electric sound generator 8 sounds the alarm. The oscillation signal continues until time t13 when the abnormal condition is eliminated.

If disconnection of the power-supply-wire 21 is detected at time t14, the port P2 becomes Lo-level as shown in FIG. 5H, the power supply from the vehicle battery 10 to the constant-voltage-power-source 5 and the amplifying circuit 7 is cut as shown in FIG. 5G, and the power supply from the auxiliary battery 2 is started as shown in FIG. 5I. If the port P2 becomes Lo-level, the microcomputer 3 determines that the wire-disconnection is present and provides the oscillation signal as shown in FIG. 5J, and the electric-sound-generator 8 sounds the alarm.

According to the above structure, the alarm device 1 has the auxiliary battery 2 which is separate from the vehicle battery 10 and receives the watch signal and watch-free signal. When the system is put on the watch and an abnormal condition is detected, it gives an alarm. If the system is put on the watch, the transistor 4 is turned on to connect the auxiliary battery 2 to the microcomputer 3. Therefore, if the power-supply-wire 21 and the grounded wire 27 are disconnected, the disconnection is detected by the wire-disconnection-detecting-circuit 6 so that the electric sound generator 8 sounds the alarm. If the vehicle battery 10 and the alarm device 1 are disconnected from each other for the maintenance service under the watch-free state, the transistor 4 is turned off to cut the power supply to the microcomputer 3 from the auxiliary battery 2, thereby deactivating the electric-sound generator 8 which gives the alarm. As a result, no specific operation is necessary to cut the electric connection between the vehicle battery 10 and the alarm device 1 and to prevent the alarmsounding.

In more detail, when the outside controller determines that the system is on the watch, the microcomputer turns on the transistor 4 to make use of the auxiliary battery 2. Thus, if one of the ultrasonic sensor 42 for detecting the access to the vehicle compartment, the window-glass-sensor 41 for detecting breakage of the windows, the vibration sensor 43 for detecting the vibrations of the vehicle detects the abnormal condition, the constant-voltage-source 5 and the amplifying circuit 7 are energized by the vehicle battery 10 to drive the electric-sound generator 8. If the wire-disconnection-detecting-circuit 6 detects disconnection of the power-supply-wire 21 connecting the microcomputer 3 and the vehicle battery 10 and the grounded wire 27, the auxiliary battery 2 energizes the constant-voltage-source 5 and the amplifying circuit 7 to drive the electric-sound generator 8, thereby sounding the alarm. If the vehicle battery 10 and the alarm device are disconnected for a maintenance service in the watch-free state, the transistor 4 is turned off to prevent the auxiliary battery 2 from energizing the constant-voltage source 5, thereby deactivating the electric-sound generator 8.

Because either the watch signal or the watch-free signal is transmitted to the microcomputer 3 through the input wire 50 and the microcomputer 3 determines whether the vehicle is on the watch or not, any separate input wire other than the input wire 50 is not necessary. If the input wire 50 is disconnected when the vehicle is on the watch, the microcomputer 3 drives the electric-sound-generator 8 through the amplifying circuit 7 to sound the alarm. Therefore, the alarm device 1 provide a high security.

Further, a signal indicating an abnormal condition is sent to the microcomputer 3 through the input wire 50 from one of the ultrasonic sensor 42, window-glass-sensor 41, vibration sensor 43. Therefore, no wires in addition to the input wire 50 is necessary, and the alarm device 1 has a small number of parts.

The auxiliary battery 2 supplies power only when the power-supply-wire 21 is disconnected while the system is put on the watch. Therefore, the auxiliary battery 2 is prevented from supplying unnecessary power so that the charged power of the auxiliary battery 2 may not lowers when it is shipped.

A reference numeral 13 indicates a diode for preventing problem due to the reverse connection.

(Second Embodiment)

Figure 6:
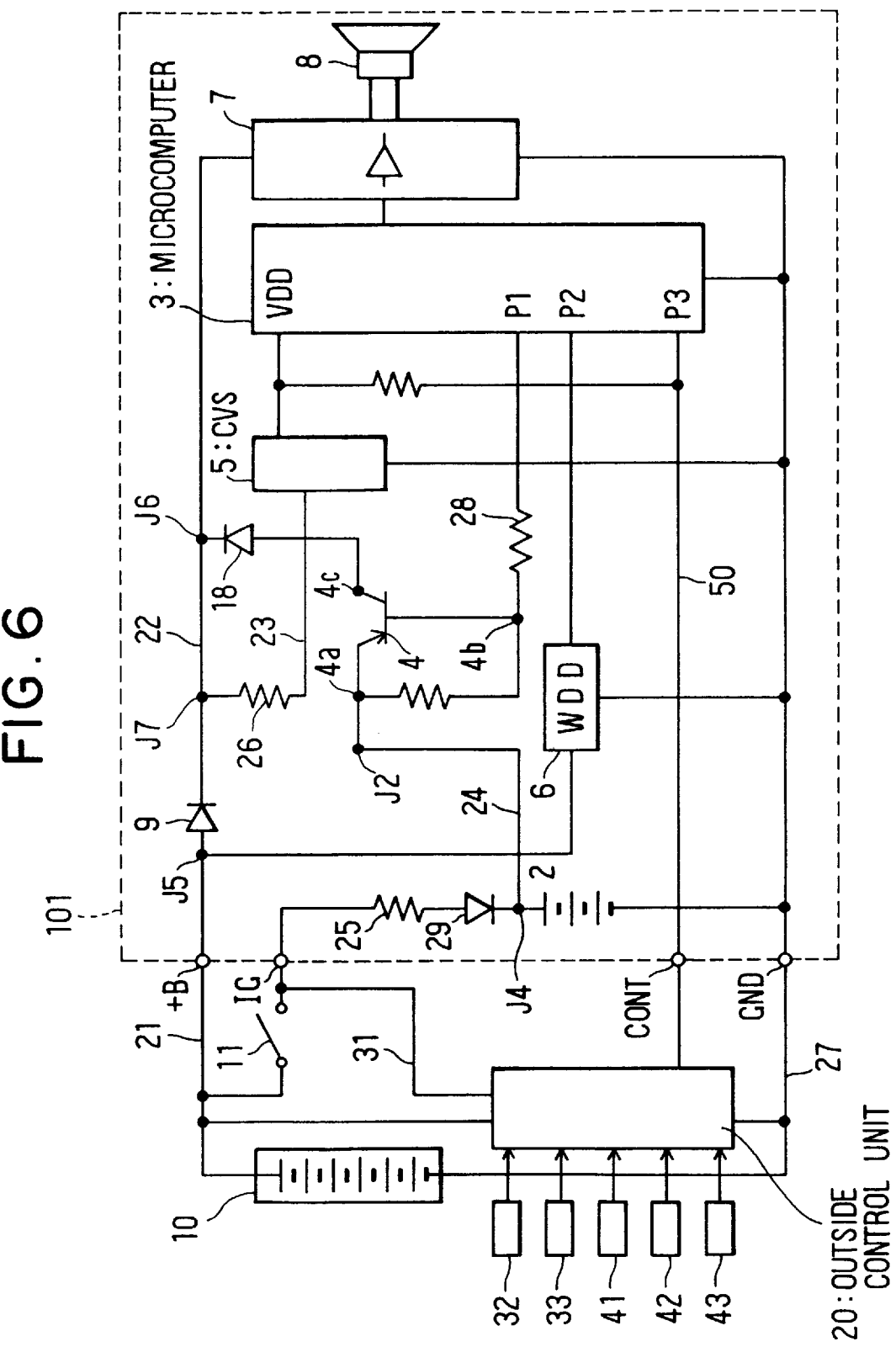
FIG. 6 is a schematic circuit diagram showing the alarm device according to a second embodiment of the present invention.

FIG. 6 is a schematic circuit diagram showing an alarm device 101 according to a second embodiment of the present invention. The power from the auxiliary battery 2 in this embodiment is supplied only through the transistor 4 to the power-supply-wire 22, and the constant-voltage-source 5 is energized through the power-supply-wire 22 and a resistor 26.

As shown in FIG. 6, a diode 18 is connected between the transistor 4 and the power-supply-wire 22 with the cathode thereof connected to a junction J6 of the power-supply-wire 22 and the anode thereof connected to connected to the collector of the transistor 4. The power-supply-wire 23 is connected between the constant-voltage-source 5 and a junction J7 through a resistor 26. The junction J7 is located on the power-supply-wire 22 between the diode 9 and the junction J6. The diodes 12 and 14 shown in FIG. 1 are omitted. Other portions are the same as those of the first embodiment.

In the alarm device 101 according to the above embodiment, the constant-voltage-source 5 and the amplifying circuit 7 are energized by the vehicle battery 10 through the power-supply-wires 23 and 22 when the vehicle is on the watch. If the power-supply-wire 21 is disconnected, the power is not supplied from the vehicle battery 10 but is supplied to the amplifying circuit 7 from the auxiliary battery 2 through the transistor 4, diode 18 and the power-supply-wire 22 and to the constant-voltage-source 5 through resistor 26 and the power-supply-wire 23.

On the other hand, when the system is not put on the watch, the transistor 4 is turned off by the signal sent from the microcomputer 3 so that the power is not supplied to the constant-voltage-source 5 and the amplifying circuit 7 from the auxiliary battery 2.

As a result, the auxiliary battery 2 is allowed to supply power when the car is on the watch, which results in the same effect as the first embodiment. The above embodiment has reduced number of diodes as compared with the first embodiment, resulting in a simpler structure.

The transistor 4 can be replaced with MOSFET or a relay which functions to switch over the current path.

The window-glass sensor 41, the ultrasonic sensor 42 and the vibration sensor 43 of the above embodiment can be replaced with any other sensor for detecting the abnormal condition. For example, a clinometer can be used to detect a degree of the inclination of the vehicle and gives the alarm when the degree exceeds a threshold level. A vehicle speed sensor or an infrared sensor or the like can be also used to detect the abnormal condition of the vehicle.

The alarm devices 1 and 101 are described as devices to be applied to the anti-theft system of the vehicle here, however the present invention is not limited to this field. The present invention can be applied to other anti-theft systems as far as the device has the auxiliary battery therein which supplies power to the alarm device when a power-supply-wire is disconnected.

The present invention is not limited to the anti-theft system. For example, it is applied to an alarm device for a system other than the anti-theft system which gives the alarm when the system gets into trouble.

What is claimed is:

1. An anti-theft system for a vehicle including a vehicle battery, an ignition key switch, a sensor for detecting access to a compartment of said vehicle, a control unit connected to said ignition switch and said access-detecting sensor for determining whether or not said system is on the watch and an alarm device connected to said vehicle battery and said control unit, wherein said alarm device comprises:

an integrated auxiliary battery;

an alarming-sound generator for sounding when energized;

a disconnection-detecting unit for detecting disconnection of said alarm device from said vehicle battery;

a driving unit, connected to said disconnection-detecting unit and to said control unit, for activating said alarming-sound generator when said driving unit is supplied with power; and power supplying means, connected to said auxiliary battery and said driving unit, for supplying power from said auxiliary battery to said driving unit when said control unit determines that said system is on the watch and said disconnection-detecting unit detects a disconnection of said alarm device from said vehicle battery, wherein said supplying means cuts power supplied to said driving unit when said control unit determines that said system is not on the watch, regardless of whether or not said disconnection-detecting unit detects a disconnection.

2. An anti-theft system as claimed in claim 1, further comprising a door-lock switch for sensing operation of a door lock, wherein said control unit determines that said system is on the watch when said ignition switch is turned off and a door-lock switch is turned off, and that said system is not on the watch when said ignition switch is turned on and said door-lock switch is turned off.

3. An alarm device for an alarming system including a main battery, an outside controller for producing a watch signal putting said system on the watch, said alarm device comprising:

an integrated auxiliary battery;

an alarming-sound generator which sounds when energized;

a driving unit, connected to said main battery and to said auxiliary battery, for driving said alarming-sound generator when power is supplied to said driving unit;

a wire-disconnection-detecting unit for producing a disconnection signal when said main battery is disconnected from said driving unit; and a changeover unit, connected between said auxiliary battery and said driving unit, for selectively supplying power from said auxiliary battery to said driving unit to control said alarming-sound generator according to said watch signal and disconnection signal, wherein
(a) said changeover unit supplies power to said driving unit when said outside controller produces said watch signal and said wire-disconnection-detecting unit produces said disconnection signal, and
(b) said changeover unit cuts power supplied to said driving unit when said outside controller does not produce said watch signal, regardless of said disconnection signal.

4. An alarm device as claimed in claim 3, wherein said driving unit is connected to said outside controller by a single input-wire to receive said watch signal so that said driving unit activates said alarming-sound generator if said single input-wire is disconnected while said system is put on the watch.

5. An alarm device as claimed in claim 3 further comprising an abnormality-detecting sensor, connected to said outside controller, for detecting an abnormal condition of said system; wherein said outside controller sends an abnormality signal to said driving unit through said single input-wire together with said watch signal, and said driving unit discriminates respective signals.

6. An alarm device for an alarming system for a vehicle including a vehicle battery, said alarm device comprising:

determining means, connected to an ignition switch of the vehicle and having a sensor to detect an operation of said vehicle, for determining whether or not said vehicle is on the watch according to a signal of said sensor;

an alarming-sound generator for sounding when power is supplied thereto;

a driving unit for supplying power to said alarming-sound generator;

an integrated auxiliary battery connected to said driving unit;

an abnormality-detecting unit for producing an abnormality signal when an abnormality is detected; and a changeover unit, connected between said driving unit and said auxiliary battery, for selectively supplying power from said auxiliary battery to said driving unit according to the determination of said determining means and to said disconnection signal, wherein
(a) said changeover unit supplies power to said driving unit when said determining means determines that said system is on the watch and said abnormality signal is produced, and
(b) said changeover unit cuts power supplied to said driving unit when said determining means determines that said system is not on the watch irrespective of said abnormality signal.

7. A alarm device as claimed in claim 6, wherein said determining means further has a sensor for sensing operation of a door lock switch and determines that said system is on the watch when said ignition switch is turned off and a door-lock switch is turned off, and determines that said system is not on the watch when said ignition switch is turned on and said door-lock switch is turned off.

* * * * *